3,382,206
PENCIL RECEPTIVE FILM
Michael Karickhoff, Circleville, Ohio, assignor to E. I. du Pont de Nemours and Company, Wilmington, Del., a corporation of Delaware
No Drawing. Filed Sept. 3, 1965, Ser. No. 485,079
2 Claims. (Cl. 260—40)

ABSTRACT OF THE DISCLOSURE

From 0.5 to 10% by weight, based upon the weight of polyester, of particulate, naturally occurring, non-porous, crystalline silica having a minimum silicon dioxide content of 99.5%, an average particle size ranging between 1 and 5 microns, and a surface area ranging between 0.5 to 2.2 square meters per gram, is incorporated in film-forming polyethylene terephthalate and the resulting composition is melt-extruded to form film. The silica-containing film is subsequently biaxially oriented and heat set.

---

Film-forming linear polyesters of terephthalic acid and ethylene glycol or higher polymethylene glycols containing up to 10 carbon atoms and the production thereof are fully described in U.S.P. 2,465,319 to Whinfield and Dickson. Polyethylene terephthalate, prepared from terephthalic acid or a low molecular weight alkyl ester thereof and ethylene glycol is a particularly attractive commercial product of the described class of polyesters. Self-supporting films of this polyester, particularly in the biaxially oriented form, i.e. molecularly oriented by stretching and/ or rolling in two mutually perpendicular directions, is tough, fold resistant, chemically resistant, waterproof and weather-resistant, and, because of these pertinent advantageous characteristics, such films have been utilized for a wide variety of purposes.

Biaxially oriented polyethylene terephthalate films, however, are particularly characterized by high gloss and clarity. For many end uses, especially in the area of graphic arts (cartography, photo reproducton, documentation, etc.), metallized films and stationery supplies, wherein varying degrees of opacity and gloss are requisite, the gloss and clarity of conventional polyethylene terephthalate films are undesirable. Attempts to alter the surface characteristics of polyethylene terephthalate film to meet these requisites by such methods as mechanical abrasion, chemical treatment incorporation of pigments, delustrants, or abrasive materials into an organic coating vehicle which is subsequently applied to the film surface have proven to be unsatisfactory for a variety of reasons among which may be listed; puncturing of the film, wasteful loss of film, delamination of coatings due to poor adherability, and poor chemical resistance of applied coatings.

Incorporation of solid, finely, divided inert materials such as silica into the molten polymer prior to extrusion into film form, utilizing a process featuring twin screw extruders has given indications that a filled polyethylene terephthalate film could be successfully extruded whose characteristics both from a physical property and appearance standpoint would make them likely candidates for graphic art end uses. Finely divided inert materials heretofore specifically suggested for producing a matte finish on polymeric film, e.g., amorphous silica, talc, mica, calcium carbonate, etc., however, have not proven entirely satisfactory for one or more of the following reasons: These fillers have been found (1) to produce undesirable processing conditions, e.g., poor filtration; (2) to have detrimental effect on film properties in some cases; and (3) to have unsatisfactory characteristics for graphic art end uses such as poor pencil receptivity and unacceptable gloss-opacity-transparency balance.

It is the principal object of this invention, therefore, to provide thin, flexible, dimensionally stable synthetic, linear polyester films suitable for graphic art end uses. A more specific object is to provide dimensionally stable, biaxially oriented polyethylene terephthalate films for graphic art end uses. Still another object is to provide molecularly oriented polyethylene terephthalate films suitable for graphic art end uses having incorporated therein finely dispersed particulate matter. A further object of this invention is to provide molecularly oriented polyethylene terephthalate films suitable as a drafting film characterized by having excellent pencil receptivity and acceptable gloss-opacity-transparency balance. The foregoing and related objects will more clearly appear from the description to follow.

These objects are realized by the present invention which, briefly stated, comprises a molecularly (biaxially) oriented polymeric linear terephthalate ester film having dispersed therein from 0.5 to 10% by weight, based on the weight of polymer in the film, of a particulate, naturally occurring, non-porous, crystalline silica characterized by having a minimum silicon dioxide content of 99.9% by weight, an average particle size ranging between 1–5 microns, and a surface area ranging between 0.5–2.2 m.$^2$/g.

Although, in the description to follow, particular emphasis will be placed on the preparation of polyethylene terephthalate films (as is disclosed in Whinfield & Dickson U.S.P. 2,465,319), it is to be understood that the present invention comprehends films of any synthetic linear terephthalate ester polymer derived by reacting a glycol selected from the group having the formula $HO(CH_2)_nOH$ where $n$ is an integer from 2–10 inclusive, or 1,4-cyclohexanedimethanol, terephthalic acid or an ester forming derivative thereof or a low molecular weight alkyl ester thereof, and from 0–35% by weight of a second acid or ester thereof, such second acid being selected from the group which includes isophthalic acid, bibenzoic acid, sebacic acid, hexahydroterephthalic acid, adipic acid, azaleic acid, naphthalic acid, 2,5-dimethylterephthalic acid and bis-p-carboxy phenoxy ethane.

Unexpectedly, it has been discovered that when particles of a naturally occurring, crystalline, non-porous silica in the amounts and having the specifications stated above are incorporated in polyester films in place of the naturally occurring or synthetic amorphous silicas generally employed as fillers for thermoplastic films, a family of films highly suitable for a myriad of graphic art applications is produced which exhibit substantially no loss in physical and chemical property levels.

The non-porous crystalline silica is incorporated into the ethylene terephthalate polymer at any convenient stage prior to extrusion of the film, including incorporation of the silica as a constituent of the reaction mixture from which the polyester is prepared. Preferably, the silica particles are incorporated into molten polyester in a conventional twin-screw extruder. After thorough intermixing of the silica particles and polyester the resulting mix is extruded into the form of a thin film, quenched and thereafter, molecularly oriented by stretching the film in both the longitudinal and transverse directions and heat-set. The process conditions found satisfactory for production of the films of the present invention are as follows: (1) a longitudinal direction stretch ratio of 2.3–2.9 X (where X=the original dimension of the film), (2) a longitudinal stretching temperature (ambient) of 94–96° C. (3) a transverse direction stretch ratio of 3.0–3.2 X (4) a transverse direction stretch temperature (ambient) of 95–103° C. (5) and a heat-set temperature of 185–200° C.

As indicated above the silicas useful for purposes of this invention are the naturally occurring, non-porous crystalline silicas having a minimum silicon dioxide content of 99.9%. In addition it is essential that the silica be in particulate form having an average particle size within the range of 1 to 5 microns and a surface area ranging between 0.5 and 2.2 square meters per gram. Preferably for use in films intended for drafting and cartographic applications, the particulate silica should have an average particle size of from 2 to 3 microns and a surface area between 0.8 to 1.2 m.²/g.

The amount of the crystalline silica incorporated into the polyethylene terephthalate films for the present invention may vary from 0.5–10% by weight, based on the weight of the polymer content of the film, and will depend on the particular end use application the film is intended for. For drafting and cartographic films, from 5–10% of the silica filler will produce a product having excellent pencil receptivity and the required gloss-opacity-transparency balance. Films for non-drafting applications requiring controlled surface gloss, e.g., document and decal lamination, metallizing stationery supplies may be prepared by the introduction of 0.5–3% of the silica compound to the polyethylene terephthalate.

The following examples will serve to further illustrate the principles and preferred practice of this invention. The films illustrated in these examples both exemplifying the present invention and those serving as control examples were prepared in the following manner. Ethylene terephthalate polymer was prepared by means of an ester-interchange reaction between dimethyl terephthalate and ethylene glycol as is fully described in Whinfield and Dickson, U.S.P. 2,465,319. The finished polymer was conducted into a twin-screw extruder while being maintained at a temperature of 283° C. Various fillers including naturally occurring amorphous silicas, synthetic amorphous silicas, and the naturally occurring, non-porous crystalline silicas falling within the purview on the present invention, added to the molten polymer in the extruder and blended with the polymer as it passed through it. The rates of polymer throughput and filler addition were adjusted to give polymer containing various percentages (by weight) of the filler. For example if a filled film containing 5% by weight of the filler was desired, and a polymer throughput of 200 lbs. per hour was employed, 10 lbs. per hour of filler was added via the extruder. After extrusion, the polymer was cast into the form of a thin film, quenched, molecularly oriented by stretching, and heat-set. The extruded films were stretched in the longitudinal direction to an extent of 2.6 X at an ambient (stretch roll) temperature of 94–96° C. and then in the transverse direction to an extent of 3.0 X at an ambient temperature of 98–103° C., utilizing stretching apparatus such as is fully described in U.S.P. 2,823,421 to Scarlett. The films were then heat-set at a temperature of 200° C.

EXAMPLES 1–22

Polyethylene terephthalate film (4 mils in thickness) filled with various fillers were prepared in the manner described above. Utilized as particulate matter and in the quantities specified were:

A. "Min-U-Sil" 5—naturally occurring non-porous, crystalline silica (1) average particle size 1.1 microns, (2) 5% by weight.

B. "Min-U-Sil" 10—naturally occurring non-porous, crystalline silica, (1) average particle size 2.06 microns, (2) 1,3,5,7 and 9% by weight.

C. "Min-U-Sil" 15—naturally occurring, non-porous, crystalline silica (1) average particle size 2.7 microns, (2) 3,4 and 5% by weight.

D. "Min-U-Sil" 30—naturally occurring, non-porous, crystalline silica, (1) average particle size 4.19 microns, (2) 5% by weight.

E. 50/50% mixtures of "Min-U-Sils" 5 and 10, 5% by weight.

F. 50/50% mixtures of "Min-U-Sils" 5 and 15, 5% by weight.

G. 50/50% mixture of "Syloid" 404 (synthetic amorphous silica-average particle size 10 microns) and "Celite" Super Floss naturally occurring, diatomaceous silica, average particle size 4–6 microns, 4,5,7 11% by weight.

H. "Celite" Super Floss, 8, 12% by weight.

I. "Syloid" 72—synthetic amorphous silica, (1) average particle size, 4 microns, (2) 5% by weight.

K. Control film-polyethylene terephthalate—no filler.

These filled films were tested and compared with unfilled polyethylene terephthalate film to ascertain whether any degradative effects on the chemical properties had taken place. Such a degradation would be marked by a drop in intrinsic viscosity, increased carboxyl end groups level, and increased level of polyether formation (expressed as percent diethylene glycol content). These tests were carried out as follows and the results summarized in Table I.

A. Intrinsic viscosity.—the expression "intrinsic viscosity," denoted by the symbol $(\eta)_0$, is used herein as a measure of the degree of polymerization of the polymer and may be defined as: limit of $$\ln(\eta)r/c$$

as $c$ approaches 0 wherein $(\eta)r$ is the viscosity of a dilute phenol-tetrachloroethane (60:40) solution of the polymer divided by the viscosity of the phenol-tetrachloroethane mixture per se measured in the same units at the temperature, and $c$ is the concentration in grams of polymer per 100 cc.'s of solution.

B. Carboxyl end groups.—The presence of carboxyl end groups are determined by dissolving a polymer quickly in hot benzyl alcohol. The solution is then quenched immediately in a cold water bath to inhibit further degradation of the polymer, which occurs at a rapid rate at high temperatures. While the solution is still quite hot (ca. 150° C.) and before the dissolved polymer has time to precipitate, it is poured into an equal volume of chloroform. This technique maintains a clear solution during the course of the titration of the carboxyl end groups, which is carried out with a standard solution of sodium hydroxide in benzyl alcohol, using phenol red as the indicator. The carboxyl end groups, expressed as equivalents/$10^6$ g., is calculated by the formula:

$$\frac{(\lambda\text{'s NaOH (Sample)} - \lambda\text{'s NaOH (Blank)}) \times \text{XN of NaOH}}{\text{Sample wt. g.}}$$

wherein 1 lambda ($\lambda$)=0.001 ml.

C. Diethylene glycol level.—The level of diethylene glycol polymeric ethylene terephthalate may be determined by a chromotographic method. The ratio of DEG. to total diols present in polyethylene terephthalate is analyzed by gas chromatography. The polymer is saponified under essentially anhydrous conditions with potassium hydroxide (KOH) in the presence of n-butanol. Following saponification, excess KOH is precipitated with carbon dioxide. An aliquot of the cooled filtrate is analyzed by gas chromatography using hydrogen flame ionization detection. The amounts of ethylene glycol and diethylene glycol are determined by relating their peak areas to corresponding areas obtained with internal standards and expressed in terms of mol percent.

TABLE I.—DEGRADATIVE EFFECT OF VARIOUS SILICA FILLERS ON CHEMICAL PROPERTY LEVELS OF POLYETHYLENE TEREPHTHALATE FILM

| Example Number | Type Filler | Percent Filler | Particle Size (Average) | Carboxyl End Groups (Eq./10⁶ g.) | Chemical Property Levels | |
|---|---|---|---|---|---|---|
| | | | | | Mole percent Diethylene Gycol | Intrinsic Viscosity [nο] |
| 1 | "Min-U-Sil" [1] 5 | 5 | 1.1 | | | |
| 2 | "Min-U-Sil" 10 | 0.5 | 2.06 | 35 | 2.1 | 0.56 |
| 3 | do | 1.0 | 2.06 | 43 | 1.9 | 0.57 |
| 4 | do | 3.0 | 2.06 | 33 | 2.2 | 0.57 |
| 5 | do | 4.0 | 2.06 | 31 | 1.6 | 0.56 |
| 6 | do | 5.0 | 2.06 | | | |
| 7 | do | 7.0 | 2.06 | 35 | 2.4 | 0.57 |
| 8 | do | 9.0 | 2.06 | 35 | 2.1 | 0.56 |
| 9 | "Min-U-Sil" 15 | 3.0 | 2.7 | 42 | 1.9 | 0.59 |
| 10 | do | 4.0 | 2.7 | 40 | 2.0 | 0.60 |
| 11 | do | 5.0 | 2.7 | 37 | 2.4 | 0.60 |
| 12 | "Min-U-Sil" 5/"Min-U-Sil" 10 50/50% | 5.0 | | 39 | 2.1 | 0.63 |
| 13 | "Min-U-Sil" 5/"Min-U-Sil" 15 50/50% | 5.0 | | 35 | 1.9 | 0.60 |
| 14 | "Min-U-Sil" 30 | 5.0 | 4.19 | | | |
| 15 | "Syloid" 404 [2] /Super Floss [3] 50/50% | 4.0 | | 85 | 2.9 | 0.38 |
| 16 | do | 5.0 | | 57 | 3.0 | 0.46 |
| 17 | do | 7.0 | | 68 | 2.6 | 0.42 |
| 18 | do | 11.0 | | 76 | 2.5 | 0.35 |
| 19 | "Super Floss" | 8.0 | 4.6 | 45 | 4.6 | 0.49 |
| 20 | do | 12.0 | 4.6 | 47 | 4.7 | 0.45 |
| 21 | "Syloid" 72 [4] | 5.0 | | 92 | 4.1 | 0.34 |
| 22 | Control-Polyethylene Terephthalate | | | 40 | 3.5 | 0.55 |

[1] "Min-U-Sil" 5,10,15=Naturally occurring, non-porous, crystalline silicas—Pennsylvania Glass Sand Corp.
[2] "Syloid" 404=Synthetic amorphous silica—W. R. Grace Chemical Co.
[3] "Celite" Super Floss=Naturally occurring diatomaceous silica—Johns-Manville Co.
[4] "Syloid" 73=Synthetic amorphous silica (calcined)—W. R. Grace Chemical Co.

From the table, it can be seen that the polyethylene terephthalate films filled with the naturally occurring, non-porous, crystalline silicas of the present invention do not have any significant degradative effect on the chemical properties of the film; whereas the amorphous silicas, commonly used as filler material for polymeric films, do have a measurable degradative effect on the chemical properties of the polyethylene terephthalate films.

EXAMPLES 23–39

Polyethylene terephthalate films (4 mil thickness) filled with various types and quantities of the naturally occurring, non-porous, crystalline silicas characterized by the present invention were prepared as described hereinbefore. Certain physical properties of these films best characterizing the requisites for graphic art type films were determined and compared with those of an unmodified polyethylene terephthalate film. Table II below illustrates results of these tests. The tests conducted consisted of:

(1) $F_5$.—a measure of the tensile strength at an elongation of 5%. It is measured on an Instron testing machine (Model T–TB, Instron Engineering Co., Quincy, Mass.) using a sample length of 2″ (between the jaws of the machine) and a width of 1″ and elongating at a rate of 100%/min. The tensile strengths at 5% elongation are expressed in terms of force per area based on the cross-sectional area of the film. The $F_5$ value of the film indicates stability to resist deformation in sudden changes in tension.

(2). Elongation.—is the extent to which a film will stretch before breaking upon being subjected to unidirectional tension at room temperature at a constant rate of 100%/min. It is indicative of the flexibility or brittleness of the polymeric film.

(3) Thermal dimensional stability.—This property is a measure of the ability of the film to resist shrinkage at elevated temperatures. A measurement of dimensional stability may be obtained by hanging an otherwise unrestrained sample of the film of known dimensions in an oven at a known elevated temperature for a given time, measuring the new dimensions and expressing the difference in dimensions over the original dimensions as a percent shrinkage. In the tests run on the above described examples, the thermal dimensional stability of the film samples were tested at 105 and 150° C., respectively.

TABLE II.—PHYSICAL PROPERTY LEVEL OF POLYETHYLENE TEREPHTHALATE FILMS FILLED WITH NATURALLY OCCURRING, NON-POROUS, CRYSTALLINE SILICA

| Example Number | Type Filler | Percent Filler | Particle Size | Physical Property Data | | | | | | | |
|---|---|---|---|---|---|---|---|---|---|---|---|
| | | | | $F_5$ (P.s.i. × 10⁻³) | | Elongation, Percent | | Dimensional Stability | | | |
| | | | | | | | | 105 C. | | 150° C. | |
| | | | | LD | TD | LD | TD | LD | TD | LD | TD |
| 23 | None | | | 13.2 | 13.9 | 154 | 129 | 1.1 | 1.1 | 5.8 | 6.2 |
| 24 | MUS [1] 5 | 5 | 1.1 | 13.6 | 13.2 | 192 | 145 | 0.6 | 0.8 | 3.2 | 4.9 |
| 25 | MUS 10 | 0.5 | 2.06 | 12.7 | 14.9 | 93 | 84 | 0.6 | 0.8 | 2.9 | 4.0 |
| 26 | MUS 10 | 0.75 | 2.06 | 12.3 | 16.2 | 137 | 61 | 0.7 | 0.9 | 3.5 | 4.7 |
| 27 | MUS 10 | 1.0 | 2.06 | 12.1 | 14.5 | 180 | 105 | 0.6 | 0.6 | 2.0 | 2.5 |
| 28 | MUS 10 | 3.0 | 2.06 | 12.2 | 14.9 | 159 | 90 | 0.6 | 0.8 | 2.1 | 2.7 |
| 29 | MUS 10 | 4.0 | 2.06 | 12.5 | 14.3 | 212 | 154 | 0.4 | 0.7 | 1.6 | 2.8 |
| 30 | MUS 10 | 5.0 | 2.06 | 13.0 | 15.0 | 140 | 98 | 0.5 | 1.0 | 1.8 | 3.1 |
| 31 | MUS 10 | 7.0 | 2.06 | 12.3 | 14.2 | 200 | 136 | 0.8 | 1.1 | 2.2 | 4.6 |
| 32 | MUS 10 | 9.0 | 2.06 | 12.5 | 13.8 | 176 | 138 | 0.5 | 0.8 | 1.6 | 2.8 |
| 33 | MUS 15 | 3.0 | 2.7 | 11.7 | 12.6 | 184 | 121 | 0.4 | 0.8 | 1.6 | 3.3 |
| 34 | MUS 15 | 4.0 | 2.7 | | | 227 | 179 | 0.4 | 0.8 | 1.5 | 2.9 |
| 35 | MUS 15 | 5.0 | 2.7 | 11.8 | 14.0 | 192 | 129 | 0.5 | 0.9 | 1.7 | 3.0 |
| 36 | MUS 30 | | 4.19 | | | | | | | | |
| 37 | MUS 5/MUS 10 25/75% | 5.0 | | 15.5 | 13.4 | 200 | 144 | 0.4 | 0.9 | 2.5 | 5.2 |
| 38 | MUS 5/MUS 10 50/50% | 5.0 | | 12.3 | 14.6 | 193 | 141 | 0.5 | 0.9 | 1.8 | 3.4 |
| 39 | MUS 5/MUS 15 50/50% | 5.0 | | 12.3 | 13.9 | 200 | 133 | 0.6 | 1.1 | 1.4 | 4.5 |

[1] MUS—"Min-U-Sil" 5, 10, 15 and 30=Naturally occurring, non-porous, crystalline silicas—Pennsylvania Glass Sand Corp.

As can be seen from the above table, the essential physical properties of the filled films falling within the scope of the present invention not only compare favorably with those of the unfilled (control) film, but, in the case of thermal dimensional stability, a property critical to many end use applications, a significant improvement is noted.

EXAMPLES 40–46

One of the prime requisites for cartographic films is that the film have good receptivity to pencil markings. The series of films to be evaluated are drawn with a 6H A. W. Faber Castell pencil. The pencil receptivity of the different films, as measured by line density, is observed visually and with a magnifier. The films being evaluated are compared and the film which has removed the most lead from the pencil is considered to have the best pencil receptivity. Three representative samples of the oriented polyethylene terephthalate films filled with the naturally occurring, crystalline, non-porous silica, characterized in the present invention, were tested for pencil receptivity in the manner described above and compared with polyethylene terephthalate prepared utilizing conventional silicas as well as talc, mica and calcium carbonate as the filler. The results of these tests described in Table III, show the wide superiority of the filled polyethylene terepthalate film of the present invention over the filled films prepared using conventional silicas.

incident on, a specimen for the specified solid angles) of a specimen at the specular direction comparisons are made with 60, 20, or 85 degree geometry utilizing a Gardner Glass Meter (H.A. Gardner Laboratory Inc., Bethesda, Md.).

Opacity.—A measure of hiding power for a film. The ratio of reflected energy when the film has a black backing to the reflected energy with a white backing. This is measured on a "colormaster" differential colorimeter (Manufacturer's Engineering and Equipment Corp., Hatboro, Pa.) using the green filter.

Transparency.—An estimate of the energy transmitted

TABLE III.—PENCIL RECEPTIVITY OF ORIENTED POLYETHYLENE FILMS FILLED WITH NATURALLY OCCURRING NON-POROUS CRYSTALLINE SILICA COMPARED WITH THOSE PREPARED WITH CONVENTIONAL SILICA FILLERS

| Example Number | Type Filler | Percent Filler | Pencil Receptivity Rating |
|---|---|---|---|
| 40 | MUS [1] 10 | 9 | Excellent. |
| 41 | MUS [1] 10 | 7 | Very good. |
| 42 | MUS [1] 10 | 5 | Good. |
| 43 | MUS 15 | 5 | Do. |
| 44 | MUS 5 | 5 | Do. |
| 45 | "Celite" [2] Super Floss | 5 | Unsatisfactory. |
| 46 | Talc (3MgO.4SiO$_2$.H$_2$O) [3] | 5 | Do. |
| 47 | Mica (3Al$_2$O$_3$.K$_2$O.6SiO$_2$.2H$_2$O) [4] | 5 | Substantially No Receptivity. |
| 48 | Calcium Carbonate [5] | 5 | Do. |

[1] MUS 5, 10, 15—"Min-U-Sil" 5, 10 & 15=Naturally occurring non-porous crystalline silicas—Pennsylvania Glass Sand Corp.
[2] "Celite" Super Floss=Naturally occurring diatomaceous silica—Johns-Manville Co.
[3] Average particle size 80 microns.
[4] Average particle size 90 microns.
[5] Average particle size 60 microns.

EXAMPLES 49–70

In addition to good pencil receptivity, cartographic materials must possess satisfactory gloss-opacity-transparency balance. This is particularly true for cartographic materials to be employed in reproduction processes, i.e., diazo, ozalid, microfilming, etc. In any of these reproduction processes, the gloss-opacity-transparency balance is critical. The film not only must possess sufficient transparency to obtain satisfactory printing speeds, but must also have a low degree of reflectance (gloss) and sufficient opacity for image reproduction. The degree of desired opacity and transparency will, of course, vary with the reproduction means to be employed. For example, a film to be used in microfilming will require a higher degree of opacity than will one used for a diazo process. A gloss-opacity-transparency balance satisfying the needs of most reproduction processes will comprise:

A. Gloss.—less than 20%
    B. Opacity.—10–40%
    C. Transparency.—20–50%

Gloss.—Defined as the luminous fractional reference (the ratio of the luminous flux reflected from, to that through the film with little scattering. The ratio of transmitted energy to reflected energy. The "Colormaster" differential colorimeter is employed using the green filter.

Table IV below lists the gloss, opacity and transparency values for both representative samples of films (4 mils in thickness) prepared as in Examples 1–23 filled with the naturally occurring, non-porous, crystalline silicas of the present invention and samples of filled films prepared utilizing conventional silicas.

TABLE IV.—GLOSS-OPACITY-TRANSPARENCY BALANCE OF POLYETHYLENE TEREPHTHALATE FILMS FILLED WITH NATURALLY OCCURRING NON-POROUS CRYSTALLINE SILICA COMPARED TO ORIENTED POLYETHYLENE TEREPHTHALATE FILMS FILLED WITH CONVENTIONAL AMORPHOUS SILICAS

| Example Number | Filler | | 60° Gloss | Opacity, Percent | Transparency Percent |
|---|---|---|---|---|---|
| | Type | Percent | | | |
| 49 | MUS 5 | 5 | 14.9 | 13.4 | 45.2 |
| 50 | MUS 10 | 5 | 13.0 | 10.5 | 36.5 |
| 51 | MUS 10 | 5.5 | 17.1 | 24.1 | 28.5 |
| 52 | MUS 10 | 7 | 15.4 | 23.2 | 31.4 |
| 53 | MUS 10 | 9 | 15.8 | 30.6 | 20.0 |
| 54 | MUS 15 | 5 | 18.4 | 20.9 | 34.2 |
| 55 | MUS 10/MUS 5, 25/75% | 5 | 16.4 | 23.8 | 28.7 |
| 56 | MUS 10/MUS 5, 50/50% | 5 | 22.1 | 22.6 | 31.2 |
| 57 | MUS 15/MUS 5, 50/50% | 5 | 18.6 | 26.9 | 26.0 |
| 58 | MUS 10 | 0.5 | 88.5 | 1.0 | 92.1 |
| 59 | MUS 10 | 0.75 | 57.0 | 1.5 | 90.8 |
| 60 | MUS 10 | 1.0 | 52.3 | 2.1 | 88.4 |
| 61 | MUS 10 | 3.0 | 37.6 | 4.5 | 76.3 |
| 62 | MUS 10 | 3.1 | 40.3 | 5.0 | 75.2 |
| 63 | MUS 10 | 4.0 | 20.0 | 14.2 | 47.2 |
| 64 | MUS 15 | 3.0 | 26.8 | 11.1 | 55.5 |
| 65 | MUS 15 | 4.0 | 20.3 | 18.4 | 38.9 |
| 66 | "Celite" Super Floss | 8.0 | 13.0 | 45.0 | 6.8 |
| 67 | do | 12.0 | 10.8 | 66.0 | 2.2 |
| 68 | SF [1]/Syloid 404 50/50% | 5.0 | 9.5 | 32.8 | 13.7 |
| 69 | do | 7.0 | 6.1 | 35.9 | 11.1 |
| 70 | do | 11.0 | 4.5 | 49.0 | 4.6 |

[1] SF=Naturally diatomaceous silica—Johns-Manville Co.

From Table IV, it can be evidenced that films falling well within the above described specifications for cartographic films may be obtained by incorporating from 5–10% of the crystalline silicas of the present invention into oriented polyethylene terephthalate films. Films having 4% silica content are marginally acceptable and those having less than 4% are unacceptable for cartographic end uses. Filler contents of greater than 10%, will lead to below acceptable transparency values and have a tendency to complicate film processing procedures. In contrast with the films containing the crystalline silicas, those oriented polyethylene terephthalate films having conventional amorphous silica fillers incorporated therein in amounts within the general range specified, do not possess the requisite gloss-opacity-transparency balance.

Although the oriented polyethylene terephthalate containing less than 4–5% of the crystalline silica filler, are not acceptable candidates for cartographic uses, they are likely candidates for many non-cartographic applications. For example, modified films having controlled surface gloss may be prepared by introducing 0.5–3% of the crystalline silica into polyethylene terephthalate film. Thus, films containing 0.5 crystalline silica are characterized by a 60° gloss of 80±10%, those having 1%, 50±10%, those having 3%, a 60° gloss of 30±10%. Such films having controlled capacity will find great use in such end uses as:

(1) Document and decal laminations
(2) Contact embossing (release sheet)
(3) Flip-file envelopes
(4) Metallizing
(5) Stationery supplies The filled film for the present invention provide for a long existing need for industry today, i.e., films ideally suited for graphic art end uses which requires no coating or special abrasive equipment. By reason of their excellent surface characteristics, these filled films may be employed in a wide variety of end uses. Although of prime importance is their adaptability to drafting and cartographic applications, many other important graphic art end use applications will also be served. The use of the crystalline silicas characterizing the present invention makes possible the production of films suited for graphic art uses which do not suffer the several serious disadvantages which have characterized previous attempts to prepare polymeric films for graphic art end uses having particulate silica incorporated therein, e.g. difficulty of processing, degradation of chemical and physical properties, and inadequate surface characteristics.

What is claimed is:

1. A film suitable for graphic art applications comprising essentially a dimensionally stable, biaxially oriented polyethylene terephthalate film having incorporated therein from 0.5 to 10% by weight, based on the weight of polyethylene terephthalate content of the film, of particulate, a naturally occurring, non-porous, crystalline silica having a minimum silicon dioxide content of 99.9% by weight, an average particle size within the range of from 1 to 5 microns, and a surface area within the range of from 0.5 to 2.2 square meters per gram.

2. A film suitable for drafting and cartographic applications comprising essentially a dimensionally stable, biaxially oriented polyethylene terephthalate film having incorporated therein from 5 to 10% by weight, based on the weight of polyethylene terephthalate content of the film, of particulate, a naturally occurring, non-porous, crystalline silica having a minimum silicon dioxide content of 99.9% by weight, an average particle size within the range of from 2 to 3 microns, and a surface area within the range of from 0.8 to 1.2 square meters per gram.

References Cited

UNITED STATES PATENTS 3,201,506   8/1965   Bills _____ 264—210

FOREIGN PATENTS 877,541   9/1961   Great Britain.

MORRIS LIEBMAN, *Primary Examiner.*

L. T. JACOBS, *Assistant Examiner.*